United States Patent [19]

Chau et al.

[11] Patent Number: 4,806,869
[45] Date of Patent: Feb. 21, 1989

[54] AN ABOVE-GROUND ARRANGEMENT FOR AND METHOD OF LOCATING A DISCRETE IN GROUND BORING DEVICE

[75] Inventors: Albert W. Chau, Redmond; John E. Mercer, Kent, both of Wash.

[73] Assignee: Flow Industries, Inc., Kent, Wash.

[21] Appl. No.: 866,242

[22] Filed: May 22, 1986

[51] Int. Cl.⁴ .................. G01V 3/165; G01S 5/00; G01B 7/14
[52] U.S. Cl. .................... 324/326; 175/45; 324/207; 342/459
[58] Field of Search ............. 324/207, 208, 326, 345, 324/346, 67; 175/45, 26; 342/459; 166/250

[56] References Cited

U.S. PATENT DOCUMENTS

| | | | |
|---|---|---|---|
| 1,926,327 | 9/1933 | Burrell et al. | 324/67 X |
| 2,601,248 | 6/1952 | Brenholdt | 324/67 |
| 2,908,863 | 10/1959 | Neff | 324/67 |
| 3,712,391 | 1/1973 | Coyne | 175/26 |
| 3,853,185 | 12/1974 | Dahl et al. | 175/45 |
| 3,906,504 | 9/1975 | Guster et al. | 342/459 |
| 3,975,735 | 8/1976 | McCullough et al. | 324/67 X |
| 4,072,200 | 2/1978 | Morris et al. | 175/45 |
| 4,295,095 | 10/1981 | Thomas et al. | 324/326 |
| 4,297,699 | 10/1981 | Fowler et al. | 175/41 X |
| 4,317,079 | 2/1982 | Yamamura et al. | 324/326 |
| 4,390,836 | 6/1983 | Bruce et al. | 324/326 X |
| 4,427,943 | 1/1984 | Cloutier et al. | 324/326 |
| 4,639,674 | 1/1987 | Rippingale | 324/326 |
| 4,710,708 | 12/1987 | Rorden et al. | 342/459 X |

FOREIGN PATENT DOCUMENTS

| | | | |
|---|---|---|---|
| 0195559 | 9/1986 | European Pat. Off. | |
| 0135671 | 11/1978 | Japan | 324/326 |
| 0027989 | 2/1980 | Japan | 324/326 |
| 0153271 | 11/1981 | Japan | 324/326 |

*Primary Examiner*—Gerard R. Strecker
*Attorney, Agent, or Firm*—Flehr, Hohbach, Test, Albritton & Herbert

[57] ABSTRACT

A technique for locating the position of a boring device within the ground with respect to a particular reference location along an above ground path directly over the intended course to be taken by the boring device is disclosed herein. This technique utilizes an electromagnetic field which is emitted from the device and an above-ground arrangement for simultaneously sensing the strength of the field at a number of distinct points. The particular sensing points are selected so that the arrangement never has to leave the path directly above the boring devices intended course to locate the boring device, even if the latter deviates laterally from the path.

19 Claims, 12 Drawing Sheets

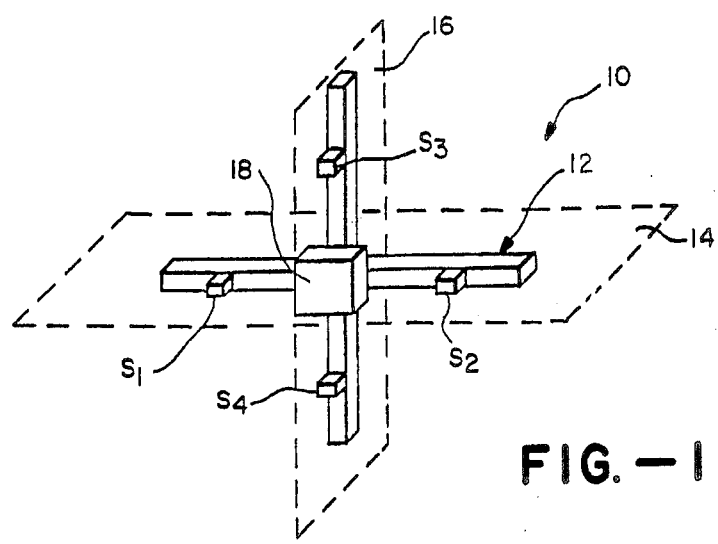
FIG.—1
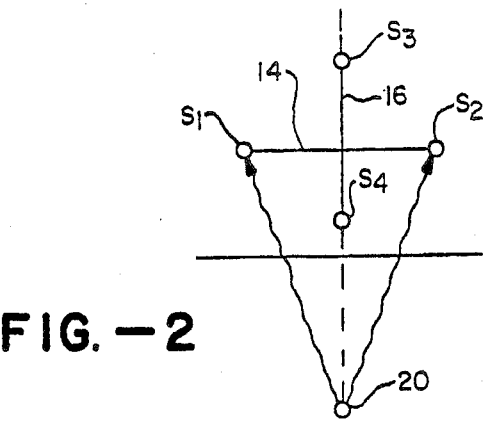
FIG.—2
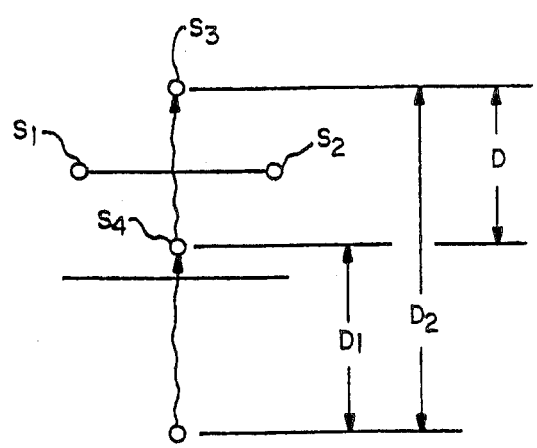
FIG.—3

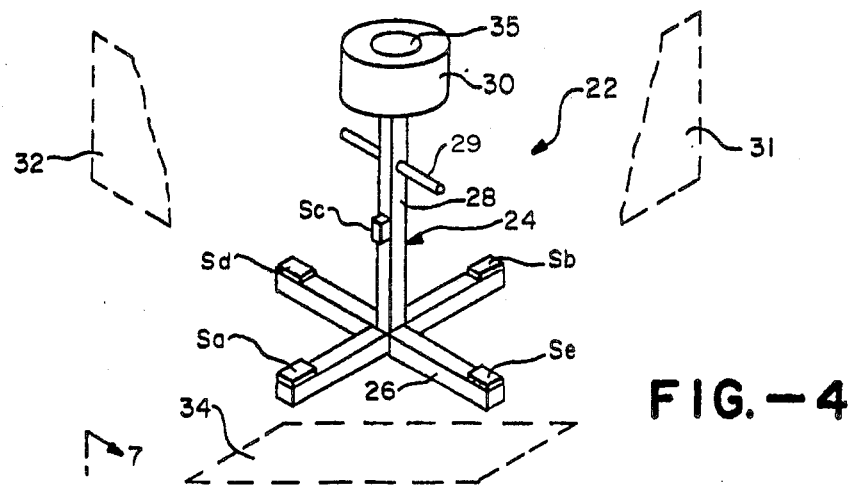
FIG.—4
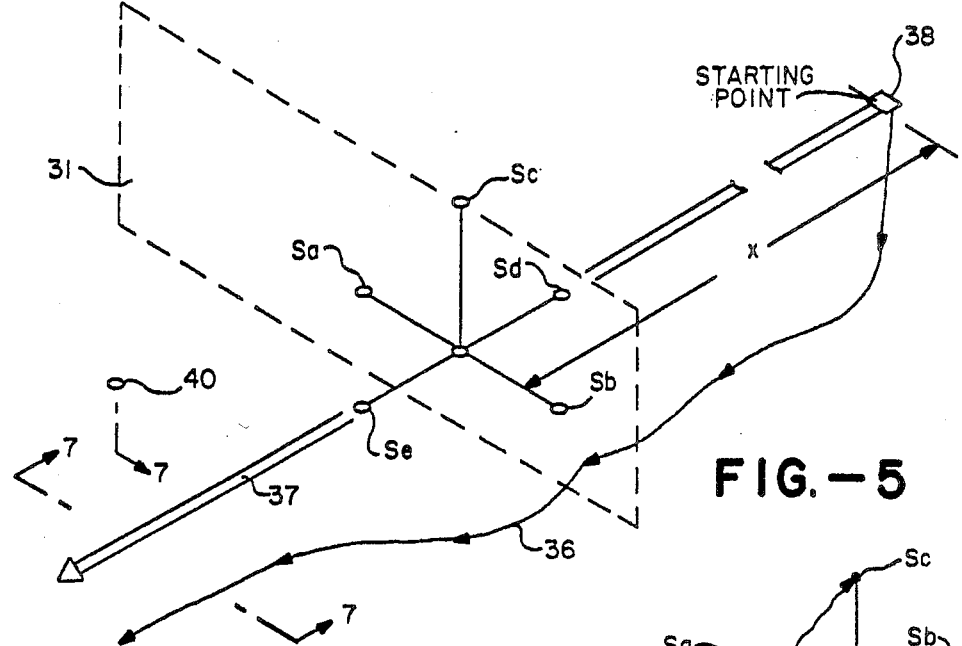
FIG.—5
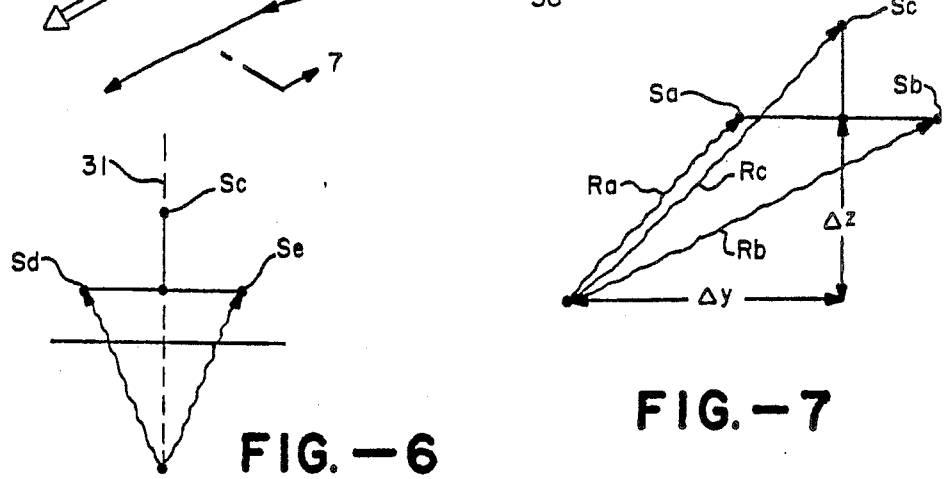
FIG.—6
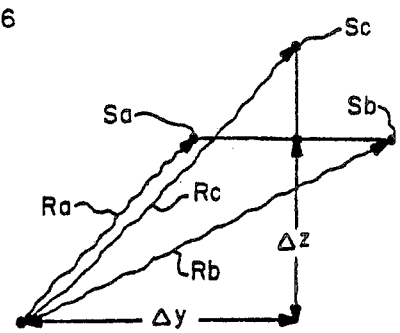
FIG.—7

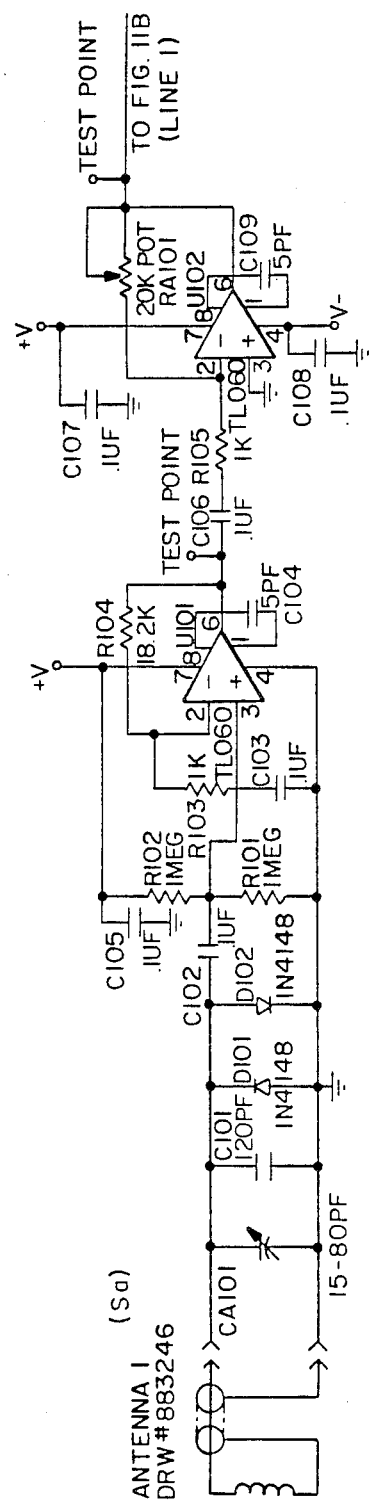
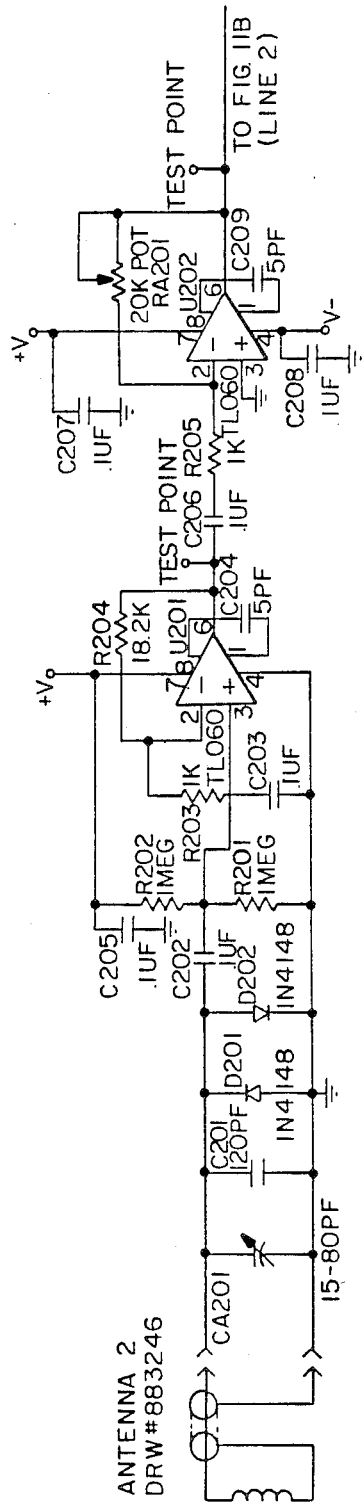
FIG.—11A
| FIG.-11A | FIG.-11B |
| --- | --- |
| FIG.-11C | FIG.-11D |
FIG.—11

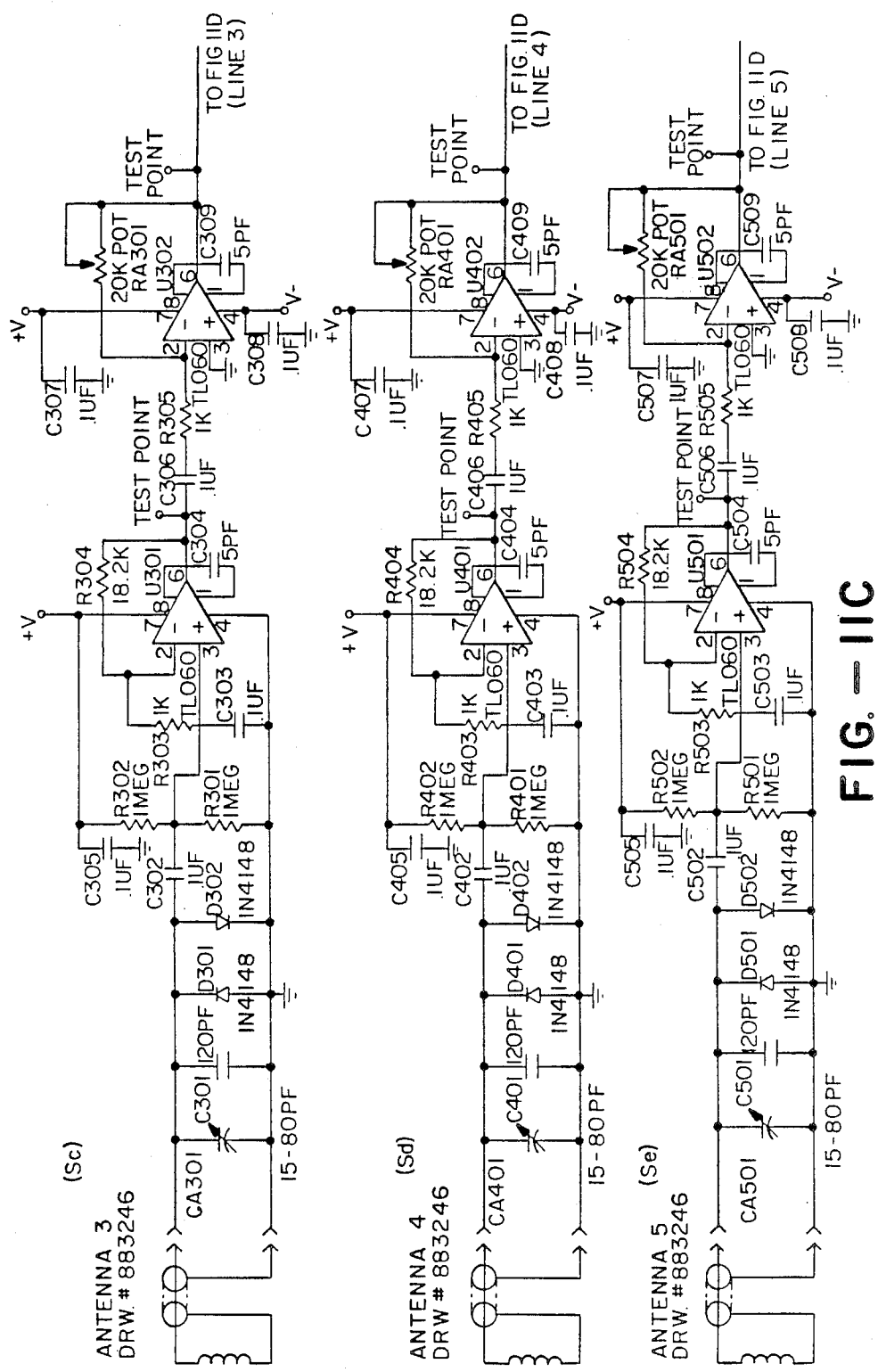
FIG.—IIC

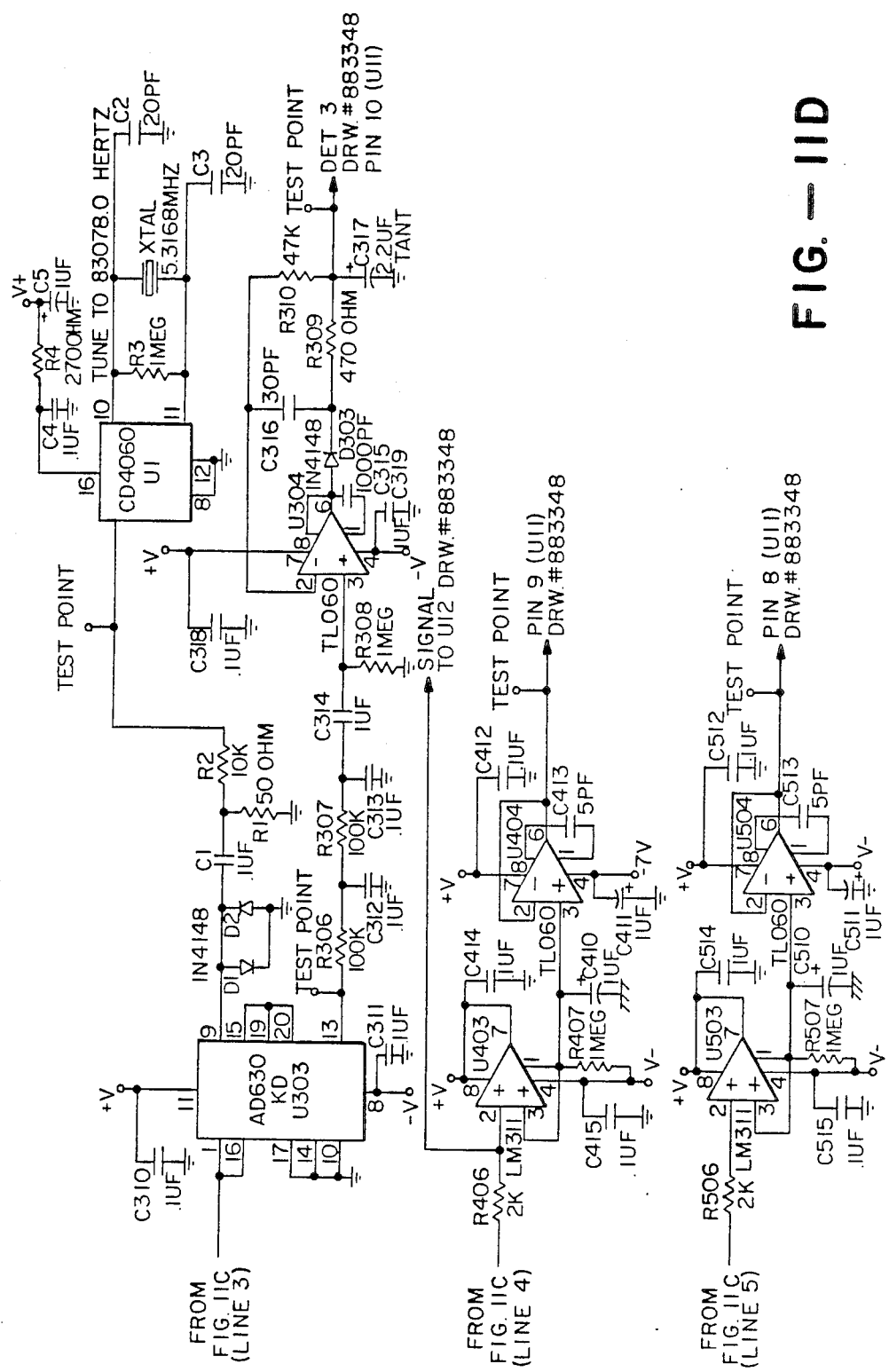
FIG.—11D

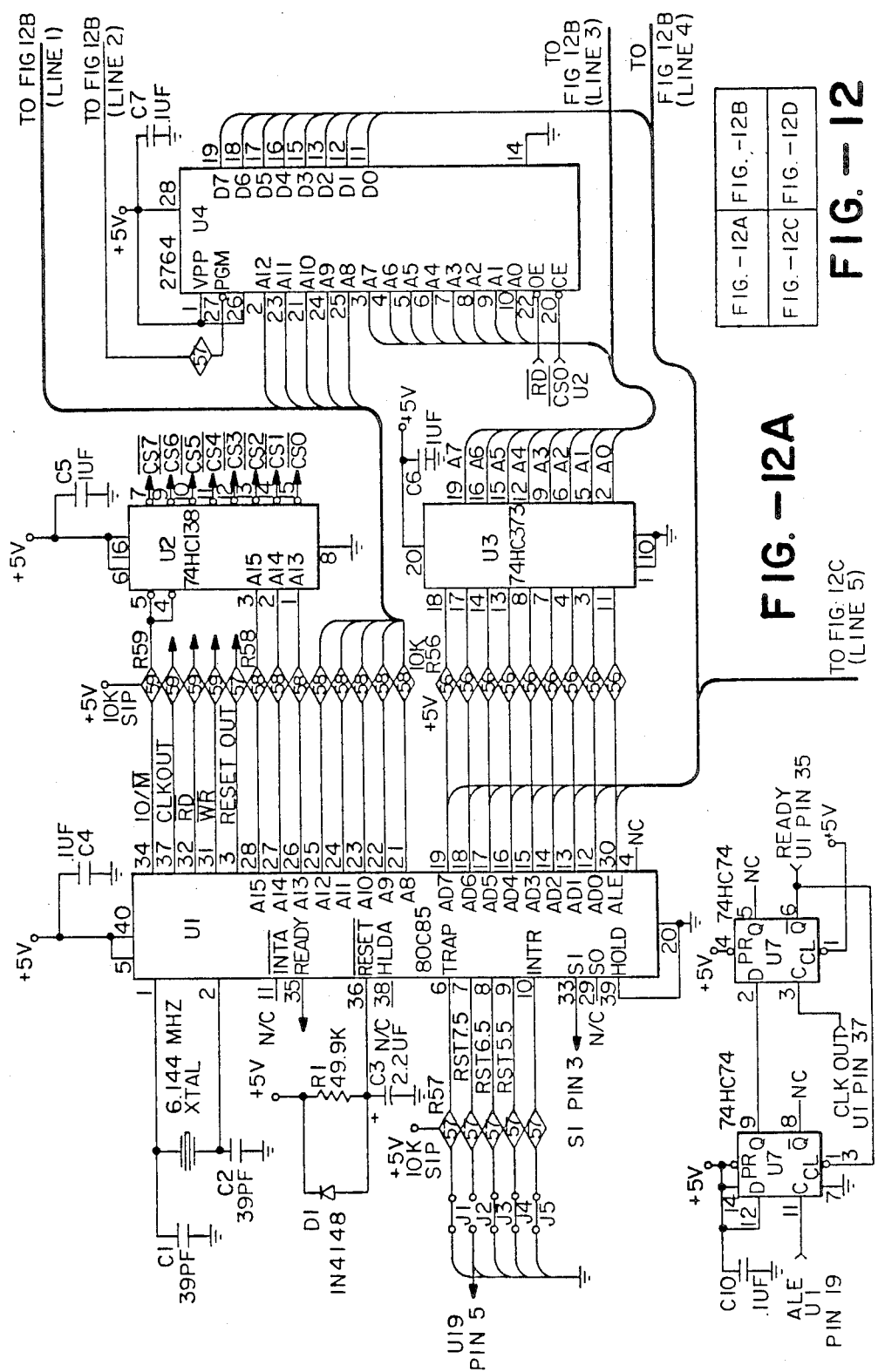

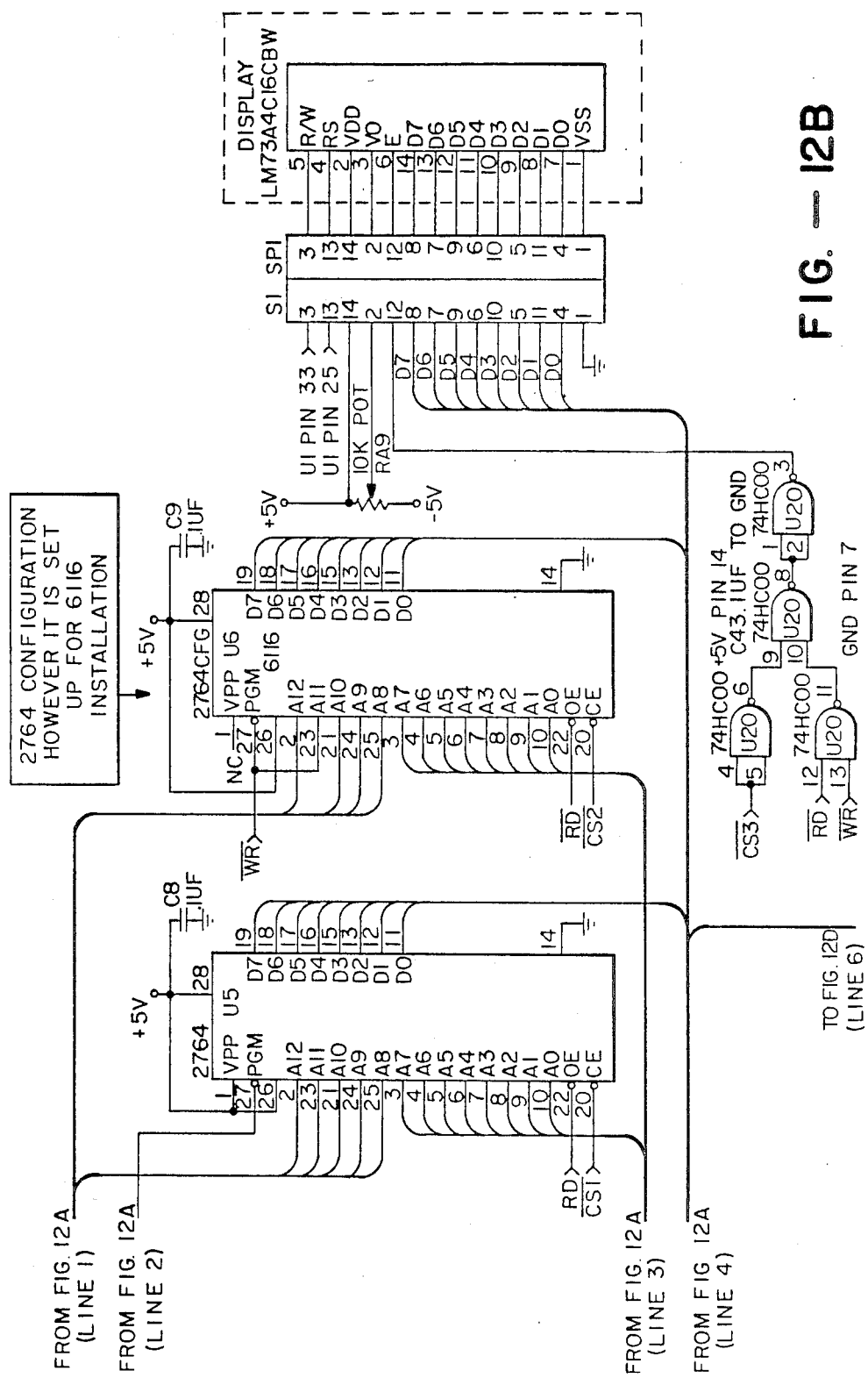
FIG. — 12B

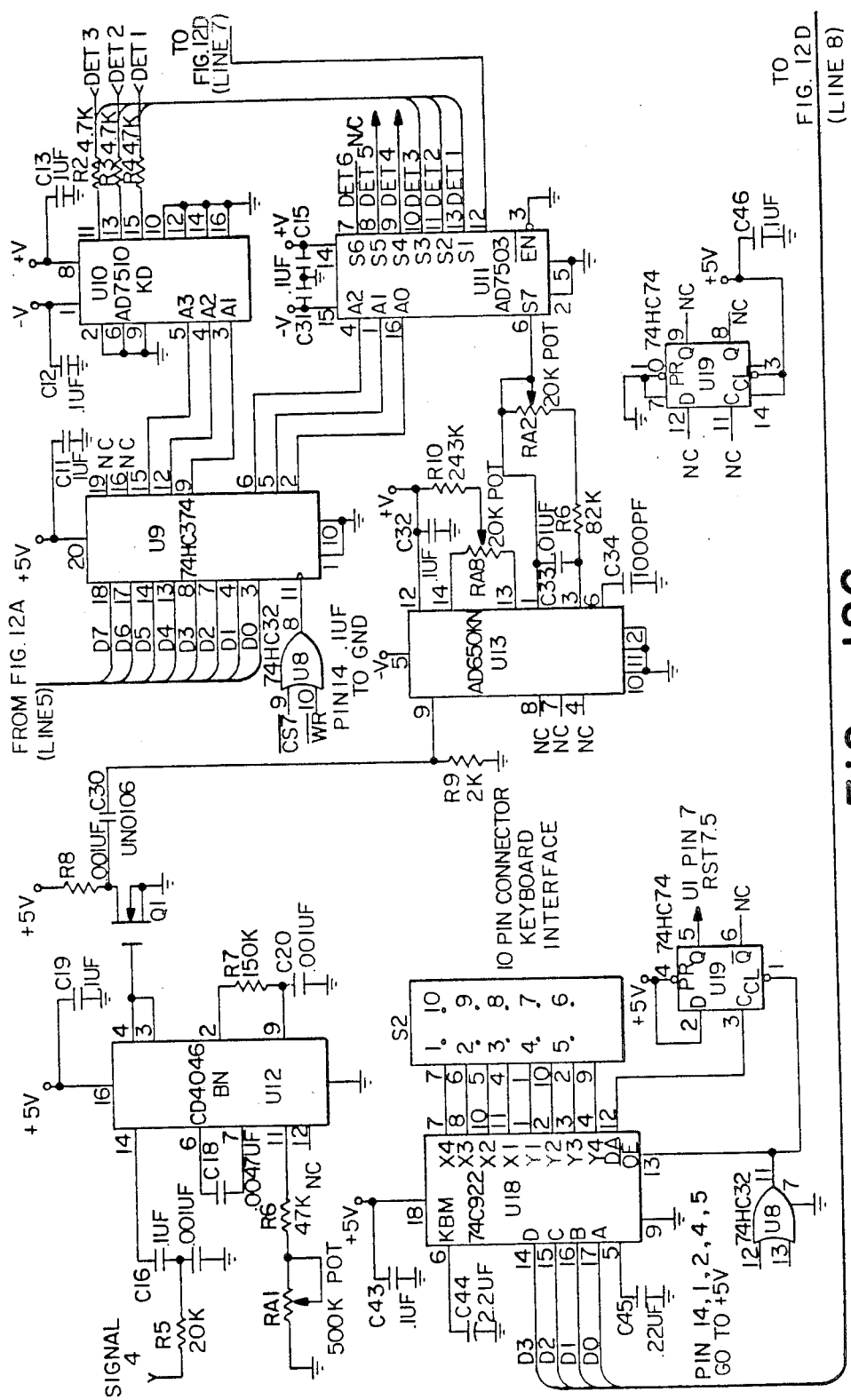
FIG.—12C

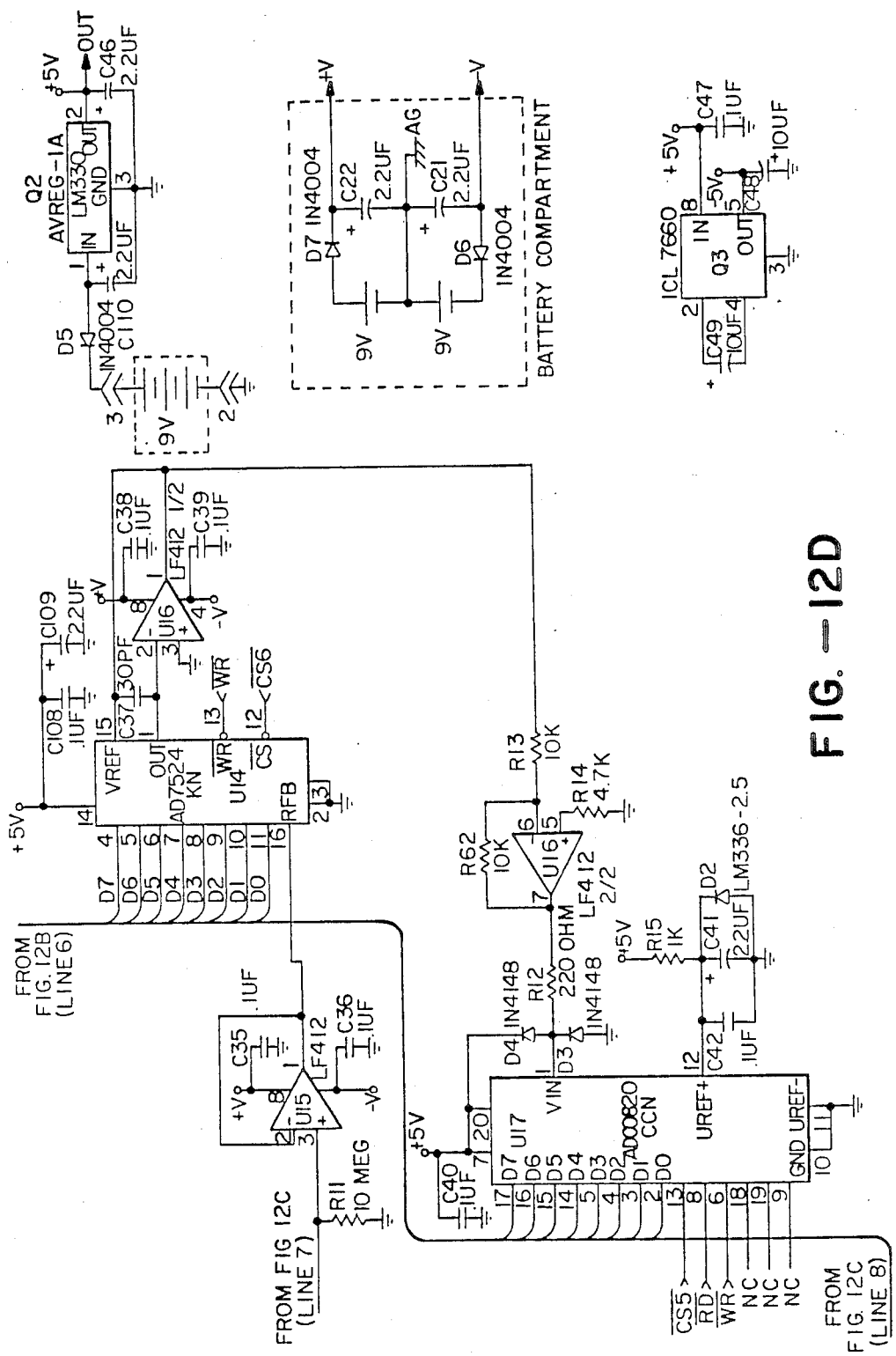
FIG. —12D

AN ABOVE-GROUND ARRANGEMENT FOR AND METHOD OF LOCATING A DISCRETE IN GROUND BORING DEVICE

The present invention relates generally to a technique for locating an inground boring device utilizing an above-ground arrangement and more particularly to a technique which is especially rapid and reliable and which allows the position of the boring device to be continuously monitored with respect to an intended course of movement, again in a rapid and reliable way.

The present invention is particularly relevant to co-pending United States applications Ser. No. 866,240, filed May 22, 1986 and entitled TECHNIQUE FOR PROVIDING AN UNDERGROUND TUNNEL UTILIZING POWERED BORING DEVICE and serial number 866,241, filed May 22, 1986 and entitled TECHNIQUE FOR STEERING AND MONITORING THE ORIENTATION OF A POWERED UNDERGROUND BORING DEVICE. In these applications, which are incorporated herein by reference, an overall system for providing a continuous underground tunnel is disclosed. This system utilizes a discrete, elongated boring device which is physically moved through the ground in the manner described in the first of the co-pending applications just recited and is steered in the manner described in the second mentioned co-pending application.

In most cases, it is desirable to move a boring device through the ground along a desired course. This requires that the position of the boring device be monitored with respect to its intended course of movement in order to compensate for any deviations. An arrangement which is presently available in the prior art to accomplish that is illustrated in FIG. 1 and generally designated by the reference numeral 10. This arrangement or locator as it may be called corresponds generally (although not necessarily literally) to one manufactured by Metrotech and will be described immediately below.

Referring specifically to locator 10 illustrated in FIG. 1, it should be noted as the outset that this tool was not designed to monitor the position of a discrete boring device but rather the position of a continuous inground, electrically conductive cable, for example a telephone or power line, in a way which requires energizing the entire line so that it acts as a radiator generating a cylindrical electromagnetic radiation pattern. The locator includes four sensors S1, S2, S3 and S4 for sensing the field strength of the electromagnetic radiation pattern and for producing corresponding electrical signals. As seen in FIG. 1, the sensors S1 and S2 are mounted on a support frame 12 within a common horizontal plane diagrammatically indicated at 14 equidistant and on opposite sides of a vertical plane diagrammatically indicated at 16. The two sensors S3 and S4 are also mounted on frame 12 in vertical plane 16 equidistant from and on opposite sides of horizontal plane 14. The sensors are electrically connected to control circuit contained within a control panel 18 also carried by frame 12.

Referring to FIGS. 2 and 3 attention is directed to the way in which arrangement 10 locates inground power, telephone or other such lines generally indicated at 20. The wavey lines represent electromagnetic radiation emanating from the line when the latter is energized.

The locator senses this radiation first to locate the vertical plane containing line 20. This is illustrated in FIG. 2. Note that only the sensors S1 and S2 are used to carry out this step. Specifically, each of these sensors senses the strength of the electromagnetic field at its position and produces a corresponding signal which is processed by the electronic circuitry in panel 18 and visually displayed on a meter (not shown) on a face of the panel. As a result, when vertical plane 16 is in the vertical plane of line 20, the strength of the electromagnetic field at the two sensors S1 and S2 will be equal, thereby producing equal electric signals.

Once the operator determines the vertical plane containing line 20, the sensors S3 and S4 are used to determine the depth of the line within the ground. This is illustrated in FIG. 3. Note that when plane 16 is contained within the vertical plane of the line, the distance between the line and sensor S4 is an unknown distance D1 and the distance between the line and sensor S3 is an unknown distance D2. At the same time, the distance between S3 and S4 is a known distance D. At the same time, it is known that the strength of the cylindrical field varies inversely with the distance from its source. Thus, the following three equations are valid where S is the strength of the field at a particular sensor, D1, D2 and D are the distances referred to above and K is a constant. The three equations are as follows:

$$S3 = K/D2 \qquad (1)$$

$$S4 = K/D1 \qquad (2)$$

$$D = D2 - D1 \qquad (3)$$

In the three equations just recited, the field strengths S3 and S4 are determined by means of the corresponding sensors and D is known. This leaves two unknowns, and two equations. The electronic circuitry contained within panel 18 can readily solve these two equations for the two unknowns and thereby determine the depth of line 20.

As indicated above, locator 10 was designed to locate continuous, fixed inground line. It was not intended to locate the position of a discrete member such a a boring device but could possibly be used for that purpose. However, in order to do so, as in the case of the continuous line, the locator must first be positioned directly over the device using the circuitry associated with S1 and S2. It would then have to search in the other direction using another means such as the signal strength at S4. Thus, if it is desirable to continuously monitor the position of a boring device relative to its intended course of movement, locator 10 could not merely follow a path directly over the intended course. Rather it would have to find the device periodically, move directly over it to measure its depth and then manually measure the distance between the above ground point directly over the device and the above ground path directly over the intended course line before the electronics could determine the position of the device with respect to the course line. These steps are extremely time consuming and require relatively large amounts of manual measurements which can lead to inaccuracies.

In view of the foregoing, it is an object of the present invention to provide an uncomplicated and yet reliable technique for monitoring the position of a discrete boring device as the latter moves through the ground.

A more particular object of the present invention is to monitor the position of the last mentioned boring device with respect to an intended course of movement, without ever having to leave the above ground path directly over the devices intended course of movement.

As will be described in more detail hereinafter, the specific locating arrangement disclosed herein utilizes an above ground, portable locator and means in the boring device itself for emitting an electromagnetic field having a predetermined radiation pattern. The locator is provided with a radiation detection network including a plurality of spaced apart sensors for sensing the strength of the electromagnetic field at an equal plurality of points within the fields radiation pattern for producing corresponding electrical input signals. The locator also includes signal processing means responsive to the strength of each of these input signals in view of their respective positions within the field for determining the position of the sensing points with respect to the boring device and therefore the position of the boring device with respect to a particular above ground location. In accordance with the present invention, the sensing points are sufficient in number and positioned relative to one another so that the above ground location does not have to be vertically in line with the boring device, as in the case of locator 10, but rather can be to one side or the other of the boring device. In other words, the present arrangement is designed in accordance wih the present invention so that the operator can carry the locator along a path directly above the intended course of movement of the boring device and locate the device relative to its intended course of movement without ever having to leave this path even if the boring device deviates from its intended course.

The arrangement discloses herein will be described in more detail in conjunction with the drawings wherein:

FIG. 1 is a diagrammatic illustration, in perspective view, of a locating arrangement designed in accordance with the prior art.

FIGS. 2 and 3 are diagrammatic illustrations of how the arrangement of FIG. 1 operates;

FIG. 4 is a diagrammatic illustration, in perspective view, of a locator designed in accordance with the present invention;

FIGS. 5-7 are diagrammatic illustrations of how the locator illustrated in FIG. 4 operates to monitor the position of an inground boring device with respect to its intended course of movement;

Figure 8:
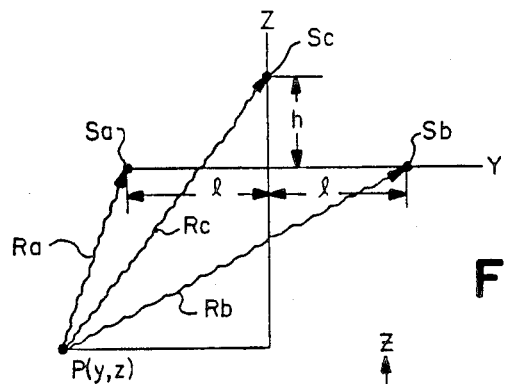
Figure 9:
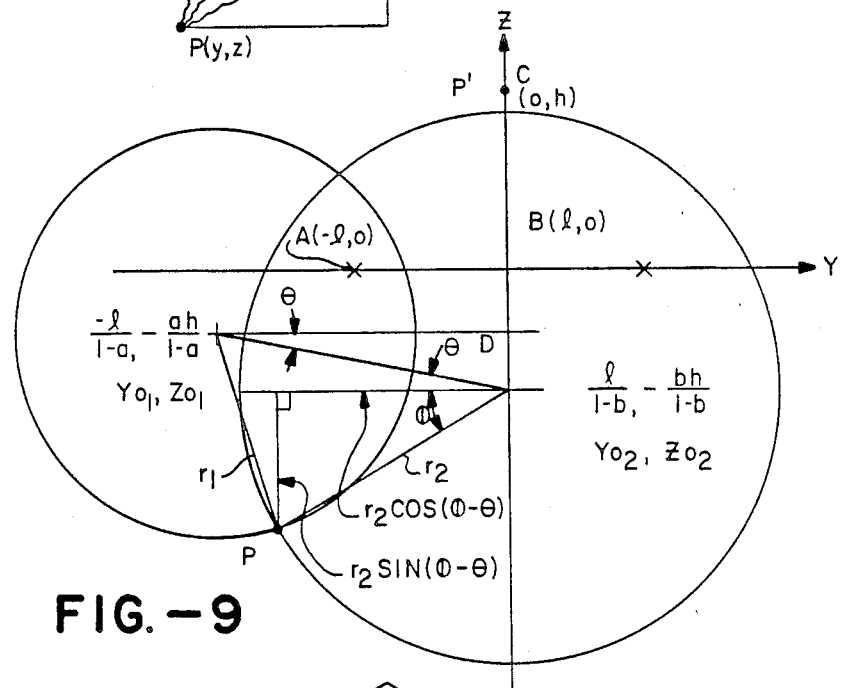
Figure 13:
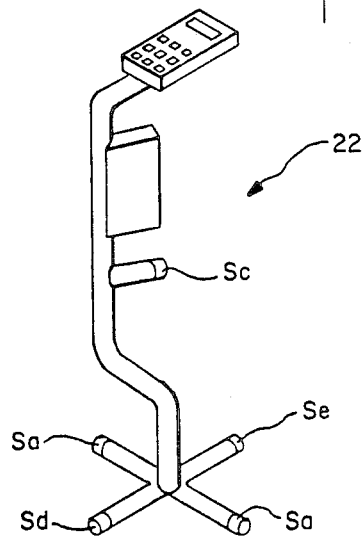
Figure 11B:
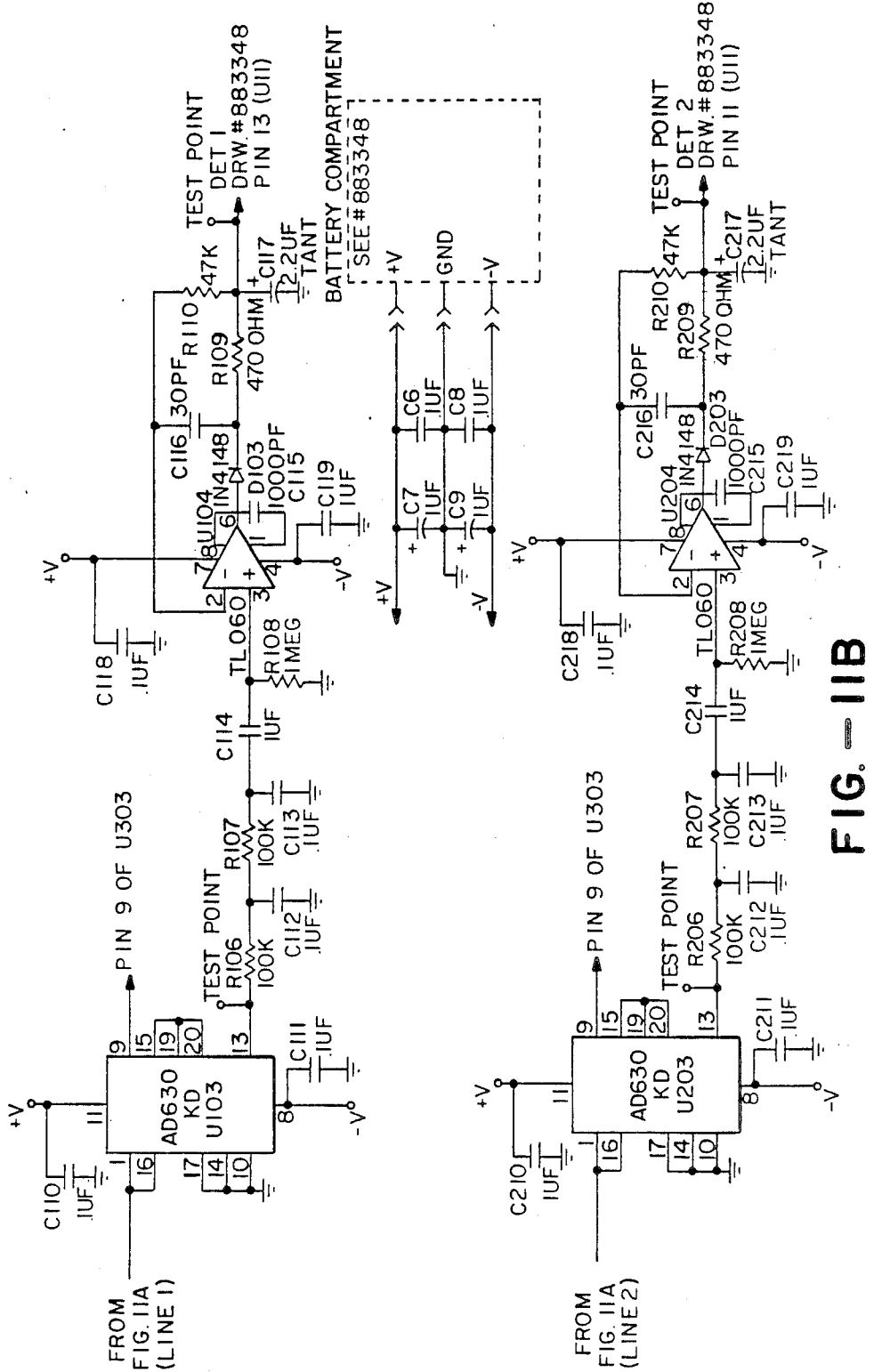

FIGS. 8 and 9 graphically illustrate an operational aspect of the locator of FIG. 4;

FIGS. 10, 11A-D, and 12A-D illustrate by means of block diagram and schematically actual working circuitry forming part of the locator of FIG. 4;

FIGS. 11 and 12 diagrammatically illustrate how FIGS. 11A-D and 12A-D interconnect with one another; and FIG. 13 illustrates an actual working locator in accordance with the present invention.

Turning now to the drawings, attention is immediately directed to FIG. 4, since FIGS. 1-3 were discussed previously. AS indicated above, FIG. 4 illustrates a locator designed in accordance with the present invention. The locator, which is indicated at 22 includes a frame 24 comprised of a four legged base 26 and an upstanding post 28. Five electromagnetic radiation sensors Sa, Sb, Sc, Sd and Se are suitably mounted to the frame in accordance with a specific positional matrix to be described below. Each of these sensors, like previously described sensors S1-S4 senses the strength of an electromagnetic field and produces a corresponding electrical signal. In an actual working embodiment, each of the sensors Sa-Se is a loop antenna.

Still referring to FIG. 4, locator 22 also includes suitable electronic circuitry contained within a control module supported on post 28. In an actual working embodiment of the present invention, the electronic circuitry includes an onboard computer which may be readily provided to function in the manner to be described. A pair of handles 29 are mounted to post 28 immediately below the module so that a single operator can easily move the entire locator about which in an actual embodiment weighs about 6 lbs and stands 40 inches high.

As will be seen below, locator 22 is capable of monitoring the position of an inground boring device relative to an intended course of movement by merely moving the locator along a path directly above the intended course of movement of the boring device, even if the latter deviates from its course of movement. This is a result of the positional relationship between the sensors. Specifically, the sensors Sa, Sb and Sc are located within a common vertical plane 31 with the sensors Sa and Sb located on opposite sides and equidistant form a second vertical plane 32 normal to plane 31. In addition, the sensor Sc is located at the intersection of these two planes at a point vertically above the two sensors Sa and Sb. Sensors Sd and Se are located in plane 32 on opposite sides of and equidistant from plane 31. In the specific embodiment illustrated, the sensors Sa, Sb, Sd and Se are located in a common horizontal plane 34. While not shown, all five of these sensors are connected into the electronic circuitry contained in module 30 by suitable lead wires which are preferably contained within frame 24. The module itself includes a number of controls and switches (not shown) and a visual readout display generally indicated at 35.

Turning now to FIGS. 5, 6 and 7 in conjunction with FIG. 4, attention is directed to the way in which locator 22 operates in accordance with the present invention. At the outset, it is to be understood that the boring device itself contains suitable means for generating an electromagnetic radiation field and specifically a dipole field, as contrasted with the cylindrical field used in conjunction with locator 10. For purposes of discussion, the intended course of movement of the boring device is shown at 36 extending below and in vertical alignment with an above ground walking path generally indicated by the arrow 37, both of which begin at a starting point 38. It will be assumed that the operator knows or can readily calculate the vertical distance between the desired course line 36 and walking path 37 at any point on the latter. It will also be assumed that the boring device itself which is indicated at 40 is laterally to one side of its intended course. Also, it will be further assumed that the boring device is a point source and the variations in roll and pitch angles can be ignored.

With the foregoing assumptions in mind, the way in which locator 22 locates the boring device relative to its intended course without leaving path 37 will now be described. Specifically, the operator, beginning at starting point 38, carries the locator along path 37 such that plane 31 is maintained normal to the path (even if it curves). Eventually, plane 31 will intersect boring device 40 as shown in FIGS. 5 and 6. When this occurs, the signals from sensors Sd and Se will be equal since the strength of the electromagnetic field at the Sd and Se sensing points are equal as illustrated specifically in FIG. 6. Note that these two sensors are radially equidistant from the boring device. Thus, the operator need only move along the path 37 with the locator positioned in the manner just described until sensors Sd and Se generate equal signals. This can be readily processed by the circuitry contained within module 30 and read out on indicator 35.

Once the operator finds the point on path 37 which places the boring device 40 within plane 31, the sensors Sa, Sb and Sc can be used to establish the position of the boring device relative to the locator and therefore relative to path 37 and the intended path of movement 36 of the boring device. This is illustrated in FIG. 7 in conjunction with the equations to follow. Note that the wavey lines in FIG. 7 correspond to radiation from the boring device. They also correspond to the distances between the boring device and the three sensors. $\Delta Y$ and $\Delta Z$ correspond to the laterl and vertical distances between the boring device and path 37. As indicated above, the radiation pattern generated by the boring device is a dipole pattern and therefore its field strength varies inversely with the cube of the distance from the source, that is, $1/R^3$ where R is the distance. Thus, the following three equations are valid where S is the field strength, K is a constant, and R is the distance. The equations are as follows:

$$Sa = K/R_a^3 \quad (4)$$

$$Sb = K/R_b^3 \quad (5)$$

$$Sc = K/R_c^3 \quad (6)$$

In the three equations just recited there are four unknowns, the distances Ra, Rb and Rc and the constant K. However, the distances Ra, Rb and Rc can be readily expressed in terms of $\Delta Y$ and $\Delta Z$ as will be discussed in more detail hereinafter in conjunction with FIGS. 8 and 9.

The three equations 4, 5 and 6 recited above can be expressed in the three unknowns K, $\Delta Y$ and $\Delta Z$ and therefore can be readily solved for these three unknowns. Once $\Delta Y$ and $\Delta Z$ are known, the actual distance between the boring device and its intended path of movement can be readily determined. All of this can be carried out by means of the circuitry contained within module 30. In an actual working embodiment, this circuitry includes an onboard computer which can be readily provided and readily programmed to carry out the procedure just described in view of the teachings herein. Nevertheless, the circuit actually used will be described briefly hereinafter in conjunction with FIGS. 10–12. The on board computer may be designed to also record the location of the boring device with respect to the predetermined path. Since the steering response of the boring device in the soil can be predicted the computer may generate steering commands to the operator to provide the most optimal steering correction such that over steering can be avoided. Oversteering not only produces a zig-zag path for the boring device but also results in loss of forward thrust and pull back force of the boring tool.

Locator 22 not only can continuously monitor the position of boring device 40 with respect to its intended path of movement but also could include a transmitter forming part of a feed back arrangement which automatically steers the boring device so as to move it back to its intended path of movement. Neither this feed back arrangement or the electronic circuitry required to operate the locator form part of the present invention and therefore will not be described except briefly below in conjunction with FIGS. 10–12. In addition, FIG. 13 illustrates an actual working locator indicated generally at 22' (with corresponding components primed).

Attention now is directed to the way in which $\Delta Y$ and $\Delta Z$ (FIG. 7) are calculated.

An algorithm for calculating the position of point P (FIG. 8), from the signal amplitudes at points A, B and C can be derived. Sa, Sb and Sc are signal amplitudes at A, B and C respectively. The coordinates of A, B and C are $(-L, 0)$, $(L, 0)$, $(0, H)$ respectively. The signals at A, B and C are $Sa = k/R^3a$, $Sb = k/R^3b$ and
$Sc = k/R^3c$ where k is a Constant $$Ra = ((Y + L)^2 + Z^2)^{\frac{1}{2}}$$

$$Rb = ((Y + L)^2 + Z^2)^{\frac{1}{2}}$$

$$Rc = (Y^2 + (Z - H)^2)^{\frac{1}{2}}$$

we have $Sc/Sa = R^3a/R^3c =$ $$\frac{((Y + L)^2 + Z^2)^{3/2}}{(Y^2 + (Z - H)^2)^{3/2}} \quad (7)$$

we have $Sc/Sa = R^3a/R^3c =$ $$\frac{((Y - L)^2 + Z^2)^{3/2}}{(Y^2 + (Z - H)^2)^{3/2}} \quad (8)$$

The remaining task is to solve for Y and Z, such that it satisfies equations 7 and 8.

Rearrange 7, $$\frac{(Y + L)^2 + Z^2}{Y^2 + (Z - H)^2} = (Sc/Sc)^{2/3} = a$$

likewise, $$\frac{(Y - L)^2 + Z^2}{Y^2 + (Z - H)^2} = (Sc/Sb)^{3/2} = b \quad (10)$$

The goal is to solve for Y and Z in terms of a, b, L and H.

assume $Y^2 + (Z - H)^2 \neq 0$
from 9, we have $$(Y + L)^2 + Z^2 - a(Y^2 + (Z - H)^2) = 0 \quad (11)$$

equation five is the equation of a family of circles, thus completing the square and we have from equation 10:

$$Y^2 + \frac{2YL}{1 - a} + \left(\frac{L}{1 - a}\right)^2 + Z^2 + \frac{2aHZ}{1 - a} + \quad (11A)$$

$$\left(\frac{aH}{1 - a}\right)^2 = \frac{a(H^2 + L^2)}{(1 - a)^2} \text{ or } (Y + L/(1 - a))^2 +$$

$$(Z + aH/(1 - a))^2 = \frac{a(H^2 + L^2)}{(1 - a)^2}$$

Equation 11A implies, it is the equation of a circle with center at $(-L/1 - a, -aH/1 - a)$ and radius $$\sqrt{a(H^2 + L^2/(1-a)^2}$$

Let the radius of the circle described by equation 11A be r1, and $$r1 = \sqrt{a(L^2 + H^2)/(1-a)^2}$$

by the same token, from equation 10 we have $$Y^2 - 2YL/(1-b) + (L/1-b)^2 + Z^2 + 2bHZ/(1-b) + \quad (12)$$

$$(bH/(1-b))^2 = (-L^2 + bh^2)/(1-b) + (L/(1-b))^2 +$$

$$(bh/(1-b))^2; \text{ then } (Y - L/(1-b))^2 +$$

$$(Z + bh/(1-b))^2 = b/(1-b)^2(L^2 + H^2)$$

equation 12 is a circle (FIG. 9) having its center at $(+L/(1--b), -(bH/(1-b))$ with radius $$r^2 = \sqrt{(b/(1-b)^2)(L^2 + H^2)}$$

The next task is to solve for the intersection of the circles described by equation 11A and equation 12. One of the intersections will be the solution we are looking for. Now, let D be the distance between the centers of the two circles.

$$D = \sqrt{\left(\frac{L}{1-a} + \frac{L}{1-b}\right)^2 + \left(\frac{aH}{1-a} - \frac{bH}{1-b}\right)^2} \quad (13)$$

let $\phi$ be the angle between r2 and D, we have $$\cos \phi = \frac{D^2 + r_2^2 - r_1^2}{2r_2D} \quad (14)$$

From FIG. 9

$$\cos \theta = \frac{|Y_{02} - Y_{01}|}{D} = \frac{(L/(1-a) + L/(1-b))}{D} \quad (15)$$

$$\cos \theta = \frac{L(2-a-b)}{D(1-a)(1-b)}$$

Thus the coordinate at P can be readily calculated $$P = (L/(1-b) - r_2 \cos(\phi - \theta), -bH/(1-b) - r_2 \sin(\phi - \theta)) \quad (16)$$

The other intersection P/ can be discarded, because the tool is in the ground underneath the locator.

$$\cos(\phi - \theta) = \cos\theta\cos\phi + \sin\theta\sin\phi$$

Cos $\theta$ can be evaluated from equation 15.
$$\sin^2\theta = 1 - \cos^2\theta$$

$\sin^2\phi = 1 - \cos^2\phi$, but $\cos^2\phi$ can be evaluated from equation 14.

Figure 10:
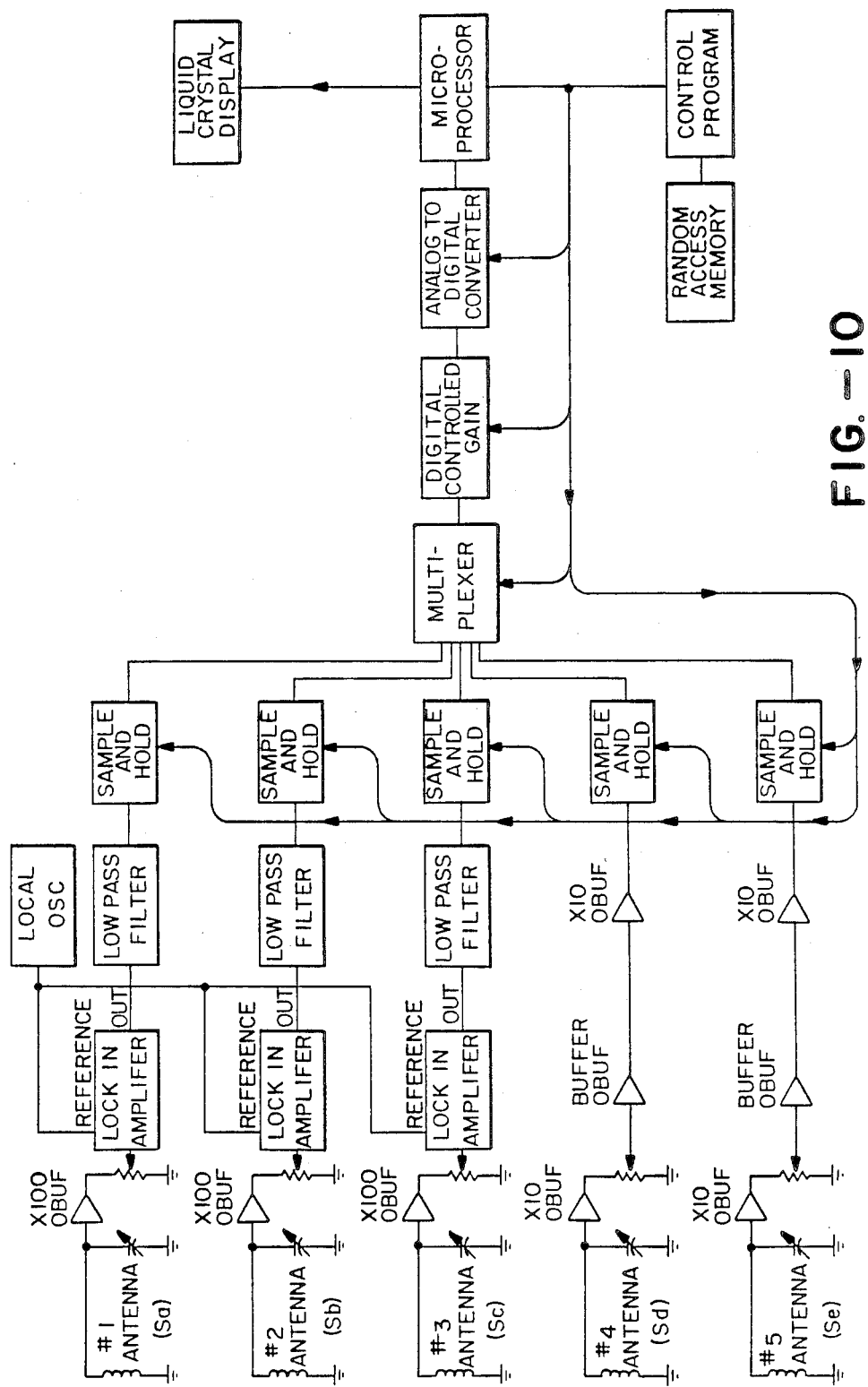

Referring specifically to FIGS. 10-12, attention is directed to the circuitry for locator 24. Note that there is circuitry associated with each electromagnetic radiation sensor Sa, Sb, Sc, Sd an Se. FIG. 10 is an actual block diagram of the overall electrical system; FIG. 11 (acutally 11A-11D) is a schematic illustration of its analog circuit; and FIG. 12 (12A-12D) is a schematic illustration of its digital circuit. As indicated above, the circuitry per se does not form part of the present invention and therefore the individual components thereof will not be described herein, except as discussed immediately below. The electronics illustrated and modified electronic circuitry may be readily provided in view of the teachings herein and the discussion to follow.

The locator disclosed herein is designed to cover a range (depth) from 1 foot to 10 feet. Since the strength of an electromagnetic radiation of magnet dipole field is proportional to $$S = K/r^3 \quad (17)$$

where S is the signal amplitude, K is the proportional constant and r is the distance between the dipole transmitter and the receiver antenna. Taking the derivative of S with respect to r, we have $$\frac{\partial s}{\partial r} = \frac{-3k}{r^4} \text{ or } \Delta S = \frac{-3k}{r^4}\Delta r \quad (18)$$

from 17 and 18

$$\frac{\Delta S}{S} = \frac{\frac{-3k}{r^4}}{\frac{k}{r^3}}\Delta r = \frac{-3\Delta r}{r}. \quad (19)$$

we can see from equation 19 that if we want to keep the error of measuring r to within 1%, i.e. $\Delta r/r \sim 1\%$, then the error in measuring the signal amplitude S has to be less than 3%. Recall that we used the ratio of the signal amplitudes from three different antennas to calculate the transmitter's location. In taking the ratio, the $\Delta S$ error increases to $2\Delta S$. Therefore, it is important to keep $\Delta S/S$ as small as possible. In addition, the locator preferrably has to cover a range of 1 foot to 10 feet and this represents a dynamic range or variation of S from to to 1000. The remaining task now is to resolve S within this 1000 to 1 range to within $3\%/2 \sim 1.5\%$. This would require a system resolution of $1000 \times 100/1.5 \approx 67,000$ (or $>2^{16}$). This is more than a 16 bit analog to digital converter can handle. Note that state of the art A/D converters that are suitable for battery operated equipment is only 14 bits. To carry out amplitude measurement for a signal that is around 80,000 hertz and with fine resolution requires a careful analysis of the limitation of the circuit components.

To accomplish the above mentioned task, the following algorithm is employed. Tunning capacitor CA101, fixed capacitor C101 and the inductance of antenna 1 (Sa), as shown in FIG. 11 form, a parallel resonance LC network and are tuned to resonance at 83.075 Khz (the transmitter's frequency). The signal is then amplified by U101 and U102 to the input of U103. U103 is configured as a demodulator, with reference signal from the local oscillator U1. The output frequency of U1 is set at 83.080 KHz. The output of U103 has two frequency components (plus noise), namely 83.080−83.075)KHz and 83.075+83.080) KHz. The output is then filtered by R106, C112, R107 and C113, such that only the low frequency component is left. The output after the low pass filter is a sine wave with an amplitude equal to the signal amplitude (high frequency) but with a frequency about 5 hertz. Thus, a conventional peak detector circuit consists of U104 can be used to record the peak amplitude. In this regard, note that state of the art peak detectors only work well below 1000 hertz. Beyond that, slew rate and settling time limitations prevent operational amplifiers to be used for high speed precision peak detector. The signal is then fed to multiplier U11, before it is fed to the programmable gain control amplifier, made up by U14 and U16. The amount of gain of U14 and U16 is $-256/D$, where D is the gain constant range from 0 to 255. Note that U14 is a latching D/A converter, and D is the digital word that the microprocessor writes to the U14's register. The output of U16 is inverted and fed to an inverting amplifier before being digitized by U17 (A/D converter). Note that U17 is an 8 bit A/D converter and the programmable gain and U17 forms an equivalent of 16 bits (65536) dynamic range and resolution of 0.4%. Although other types of gain control is available, however, the above approach eliminate any gain error, non-linearity or drift that is common to other conventional techniques. A 14 bit A/D can be used instead of U17, if better resolution is required.

The foregoing discussion is equally applicable for antennas 2(Sb) and 3(Sc) with regard to the corresponding components.

Finally is should be noted that the signal to noise ratio of system is proportional to $1/\Delta f$ where $\Delta f$ is the bandwidth. That is why we want to convert to 83.075 KHz signal at the antenna down to a few hertz for precision amplitude measurement.

What is claimed is:

1. An arrangement for locating the position of a boring device within the ground with respect to a particular reference location above ground, comprising:
    (a) means for emitting an electromagnetic field having a predetermined radiation pattern from said boring device;
    (b) detection means including a plurality of spaced-apart sensors positionable at a specific above-ground location with respect to said reference location for sensing the strength of said electromagnetic field at an equal plurality of points within the field's radiation pattern and corresponding to the positions of said sensors within the field and for producing an equal plurality of electrical input signals corresponding in strength to the strength of the field at said points; and
    (c) signal processing means acting on said plurality of input signals for determining the positions of said sensing points with respect to said boring device and with respect to said particular above-ground reference location, said sensors and associated sensing points being sufficient in number and positioned relative to one another so that said above ground reference location does not have to be vertically in line with the boring device but rather can be to one side or the other of the device;
    (d) said plurality of sensing points including first, second, third, fourth and fifth points and five sensors respectively positioned at said five points, said first, second and third sensing points defining a first vertical plane and said fourth and fifth sensing points being located on opposite sides and equidistant from said first vertical plane in a second vertical plane perpendicular to said first vertical plane.

2. An arrangement according to claim 1 including a portable housing for containing and supporting said detection means including said sensors.

3. An arrangement according to claim 2 wherein said portable housing contains said signal processing means.

4. An arrangement according to claim 1 wherein said first and second sensing points are located on opposite sides of said equidistant from said second vertical plane and wherein said third sensing point is located above and equidistant from said first and second sensing points.

5. An arrangement according to claim 1 wherein said arrangement is a self-contained portable arrangement capable of being carried above-ground by an operator, wherein said detection means and said signal processing means together includes a first group of sensors consisting of those sensors at said fourth and fifth points and cooperating electrical circuitry for first determining when the arrangement is directly over or in lateral alignment with said boring device as the arrangement is carried along said predetermined above-ground path by determining when said first plane contains said boring device, and wherein said detection means and signal processing include a second group of said sensors consisting of those sensors at said first, second and third points and cooperating circuitry for determining the vertical depth and lateral distance of said boring device with respect to said second group of sensors.

6. In a system in which a boring device is caused to move within the ground along an actual path that is supposed to conform to a predetermined path of movement of the device, a self-contained portable arrangement for locating the actual position of said boring device with respect to said predetermined path at any given point in time with said arrangement is carried above-ground by an operator along an above-ground path in vertical alignment with said predetermined path within the ground, said arrangement comprising:
    (a) means for emitting an electromagnetic field having a predetermined radiation pattern from said boring device;
    (b) portable housing means; and
    (c) means carried by said housing means and including
        (i) a plurality of spaced-apart sensors for individually sensing the strength of said electromagnetic field, and
        (ii) circuitry for producing an equal plurality of electrical input signals corresponding in strength to the strength of the field at said sensors, and for determining the position of said boring device with respect to the positions of said sensors and with respect to said predetermined path as said housing means is carried by said operator along said above-ground path, said sensors and circuitry including a first group of two sensors defining a first vertical plane, equidistant from, and on opposite sides of a second vertical plane perpendicular to said first plane, and associated circuitry for first determining when the first group of sensors are on said above-ground path directly above or in lateral alignment with said boring device, such that said second plane contains said boring device and a second group of three sensors located within said second plane and associated circuitry for determining the depth and lateral distance of said boring device relative to said second group of sensors, whereby the position of the boring device with respect to said predetermined path can then be determined by said circuitry.

7. An arrangement according to claim 6 wherein said first plane is a vertical plane and wherein the three sensors of said second group of sensors define the second vertical plane perpendicular to said first plane.

8. An arrangement according to claim 7 wherein the two sensors of said first group of sensors are located on opposite sides of and equidistant from said second vertical plane, wherein said second group of sensors are located equidistant from said first vertical plane, and wherein the third sensor of said second group is located above the other two sensors in that group at point along the intersection of the two planes.

9. A method of monitoring the position of a boring device within the ground with respect to a predesired course of movement of said device, said boring device including means for emitting a predetermined electromagnetic field, said method comprising the steps of:
(a) providing a self-contained, portable arrangement including first means including two sensors which define a first vertical plane and which are located on opposite sides of a second vertical plane perpendicular to said first plane for sensing said electromagnetic field and determining when the second plane contains the boring device and therefore determining when the arrangement is directly over or laterally aligned with said boring device at any given point in time as said arrangement moves along a path directly over said underground course and second means including three other sensors within said second plane for sensing said electromagnetic field and determining the vertical depth and lateral distance of said device with respect to the arrangement and with respect to said predesired course while said boring device is contained within said second plane; and
(b) moving said arrangement along said path as said boring device moves the ground in order to monitor its position relative to said predesired course.

10. An arrangement for monitoring the position of a boring device within the ground with respect to a predesired course, said boring device including means for emitting a predetermined electromagnetic field, said arrangement comprising:
(a) a self-contained, portable housing capable of being carried above-ground by an operator along an above-ground path in vertical alignment with said predesired course;
(b) first means including two sensors defining a first vertical plane and located on opposite sides of a second vertical plane perpendicular to said first plane for sensing said electromagnetic field, said first means being carried by said housing for determining when the second plane contains said boring device and therefore when the housing is directly over or in lateral alignment with said boring device as the housing is carried along said above-ground path; and
(c) second means including three additional sensors located within said second plane for sensing said electromagnetic field, said second means being carried by said housing for determining the depth and lateral distance of said boring device with respect to said housing and with respect to said predesired course when said second plane contains said boring device and therefore when said housing is located directly over or laterally to one side of said boring device.

11. An arrangement according to claim 10 wherein the two sensors of said first means is located on opposites sides and equidistant from said second vertical plane, wherein two of the three additional sensors of said second means are located on opposite sides of and equidistant from said first plane, and wherein the third sensor of said second means is located above the other two sensors of the second means at a point on the intersection of the two planes.

12. An arrangement according to claim 11 wherein the two sensors of said first means and the two lower sensors of said second means are all located within a common horizontal plane.

13. An arrangement for locating the position of the boring device within the ground with respect to a particular reference location above ground, comprising:
(a) means for emitting an electromagnetic field having a predetermined radiation pattern from said boring device;
(b) detection means including first, second, third, fourth, and fifth sensors positionable at a particular above-ground location for sensing the strength of said electromagnetic field at an equal plurality of points in the fields radiation pattern and corresponding to the positions of said sensors within the field and for producing an equal plurality of electrical input signals corresponding to the strength of the field at said points, said first, second and third sensors defining one and only one vertical plane such that the fourth and fifth sensors are located on opposite sides of and equidistant from said first vertical plane in a second vertical plane, such that said first and second sensors are located on opposite sides of and equidistant from said second vertical plane, and such that said third sensor is located above said first and second sensor at a point on the intersection of said first mentioned and said second planes; and
(c) signal processing means acting on said plurality of input signals for determining the positions of said sensing points with respect to said boring device and with respect to said particular above ground reference location whereby to locate the position of said boring device.

14. An arrangement according to claim 13 wherein said first, second, fourth and fifth sensors are all located within a common horizontal plane.

15. An arrangement according to claim 1 wherein said first and second sensing points are located on opposite sides of and equidistant from said second vertical plane within a third, horizontal plane and wherein said third sensing point is spaced from said first and second sensing points.

16. An arrangement for monitoring the position of a boring device within the ground with respect to a particular point, said boring device including means for emitting a predetermined electromagnetic field, said arrangement comprising:
(a) a self-contained, portable housing capable of being carried above-ground by an operator along an above-ground path;
(b) first means including two sensors defining a first vertical plane perpendicular to a second vertical plane for sensing said electromagnetic field, said first means being carried by said housing for determining when the second plane contains said boring device and therefore when the housing is directly over or in lateral alignment with said boring device as the housing is carried along said above-ground path; and (c) second means including three sensors located within said second plane for sensing said electromagnetic field, said second means being carried by said housing for determining the depth and lateral distance of said boring device with respect to said housing and with respect to said particular point when said second plane contains said boring device and therefore when said housing is located directly over or laterally to one side of said boring device.

17. An arrangement according to claim 16 wherein said two sensors are separate and distinct sensors from said three sensors.

18. An arrangement for monitoring the position of a boring device within the ground with respect to a particular point, said boring device including means for emitting a predetermined electromagnetic field, said arrangement comprising:

(a) a self-contained, portable housing capable of being carried above-ground by an operator along an above-ground path;

(b) first means including sensor means within a first vertical plane perpendicular to a second vertical plane for sensing said electromagnetic field, said first means being carried by said housing for determining when the second plane contains said boring device and therefore when the housing is directly over or in lateral alignment with said boring device as the housing is carried along said above-ground path; and (c) second means including sensor means located within said second plane for sensing said electromagnetic field, said second means being carried by said housing for determining the depth and lateral distance of said boring device with respect to said housing and with respect to said particular point when said second plane contains said boring device and therefore when said housing is located directly over or laterally to one side of said boring device.

19. An arrangement according to claim 16 wherein said first-mentioned sensor means are separate and distinct sensor means, from said second-mentioned sensor means.

* * * * *

UNITED STATES PATENT AND TRADEMARK OFFICE
CERTIFICATE OF CORRECTION

PATENT NO.   : 4,806,869
DATED        : February 21, 1989
INVENTOR(S)  : Albert W. Chau, et al.

It is certified that error appears in the above-identified patent and that said Letters Patent is hereby corrected as shown below:

ON THE TITLE PAGE:   [73], delete "Flow Industries, Inc., Kent,

Wash., a Washington corporation" and add ---FlowMole Corporation, Kent, Washington, a Delaware corporation--- as the assignee.

Signed and Sealed this

Thirteenth Day of October, 1992

*Attest:*

DOUGLAS B. COMER

*Attesting Officer*            *Acting Commissioner of Patents and Trademarks*